(12) United States Patent
Matsuo et al.

(10) Patent No.: US 9,046,010 B2
(45) Date of Patent: Jun. 2, 2015

(54) CONTROL UNIT FOR VARIABLE VALVE TIMING MECHANISM AND CONTROL METHOD FOR VARIABLE VALVE TIMING MECHANISM

(71) Applicant: HITACHI AUTOMOTIVE SYSTEMS, LTD., Hitachinaka-shi, Ibaraki (JP)

(72) Inventors: Nobuhiko Matsuo, Isesaki (JP); Kentaro Mikawa, Isesaki (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 50 days.

(21) Appl. No.: 13/845,815

(22) Filed: Mar. 18, 2013

(65) Prior Publication Data

US 2013/0247850 A1 Sep. 26, 2013

(30) Foreign Application Priority Data

Mar. 21, 2012 (JP) ................................. 2012-063832

(51) Int. Cl.
*F01L 1/34* (2006.01)
*F02D 13/00* (2006.01)

(52) U.S. Cl.
CPC . *F01L 1/34* (2013.01); *F02D 13/00* (2013.01); *F01L 2820/032* (2013.01)

(58) Field of Classification Search
CPC ........ F01L 1/34; F01L 2820/032; F02D 13/00
USPC .............................. 123/90.15, 90.17; 464/160
See application file for complete search history.

(56) References Cited

U.S. PATENT DOCUMENTS

| 5,957,095 | A | * | 9/1999 | Kako | 123/90.15 |
| 7,406,933 | B2 | * | 8/2008 | Inoue et al. | 123/90.17 |
| 7,584,729 | B2 | | 9/2009 | Tanaka et al. | |
| 2008/0071463 | A1 | | 3/2008 | Tanaka et al. | |

FOREIGN PATENT DOCUMENTS

JP 2008-057371 A 3/2008

* cited by examiner

*Primary Examiner* — Ching Chang
(74) *Attorney, Agent, or Firm* — Foley & Lardner LLP

(57) ABSTRACT

A control unit for a variable valve timing mechanism for changing a cam phase by an electric actuator determines an influence on the operation of the variable valve timing mechanism based on the engine operating conditions. Then, based on the determination result, the control unit reduces the operation amount of the electric actuator in a predetermined range of the rotation angle of a camshaft.

20 Claims, 9 Drawing Sheets

CONTROL UNIT FOR VARIABLE VALVE TIMING MECHANISM AND CONTROL METHOD FOR VARIABLE VALVE TIMING MECHANISM

BACKGROUND OF THE INVENTION

1. Field of the Invention

The present invention relates to a control unit for a variable valve timing mechanism (VTC), in which the rotation phase of a camshaft with respect to a crankshaft is changed to change at least either valve timing (opening and closing timing) of an intake valve or an exhaust valve, and a control method for the same.

2. Description of Related Art

To make valve timing freely changeable, an electrically operated VTC is known in which the rotation phase of the camshaft with respect to the crankshaft is changed by an electric motor as described in Japanese Laid-Open (Kokai) Patent Application Publication No. 2008-57371.

VTC attached to an end of the camshaft is subjected to an alternating torque (cam torque), made up of a reaction force of a valve spring and an inertial force by the mass of a movable part, according to the rotation of the camshaft. For example, in a low rpm (revolutions per minute) range of the engine, in which the alternating frequency of the cam torque is equal to or less than the drive frequency of VTC, there is a possibility that a torque necessary to change the valve timing is greater than the maximum torque of the motor unlike in a high rpm range of the engine, in which the cam torque can be regarded as an average value. In this case, the motor enters into a "locked state" in which the rotation of the motor is stopped. Since not only is no back electromotive force is generated, but also the VTC angle does not reach a target angle, an excess current (lock current) is generated in order to approximate the target angle. When the motor enters into the locked state, the motor torque is not used to change the valve timing, resulting in an increase in power consumption due to the lock current.

SUMMARY OF THE INVENTION

A control unit for VTC for changing a cam phase by an electric actuator determines an influence on the operation of the variable valve timing mechanism based on the engine operating conditions. Then, based on the determination result, the control unit reduces the operation amount of the electric actuator in a predetermined range of the rotation angles of a camshaft.

Other objects and features of aspects of this invention will be understood from the following description with reference to the accompanying drawings.

DESCRIPTION OF THE EMBODIMENTS

An embodiment for carrying out the present invention will now be described in detail with reference to the accompanying drawings.

Figure 1:
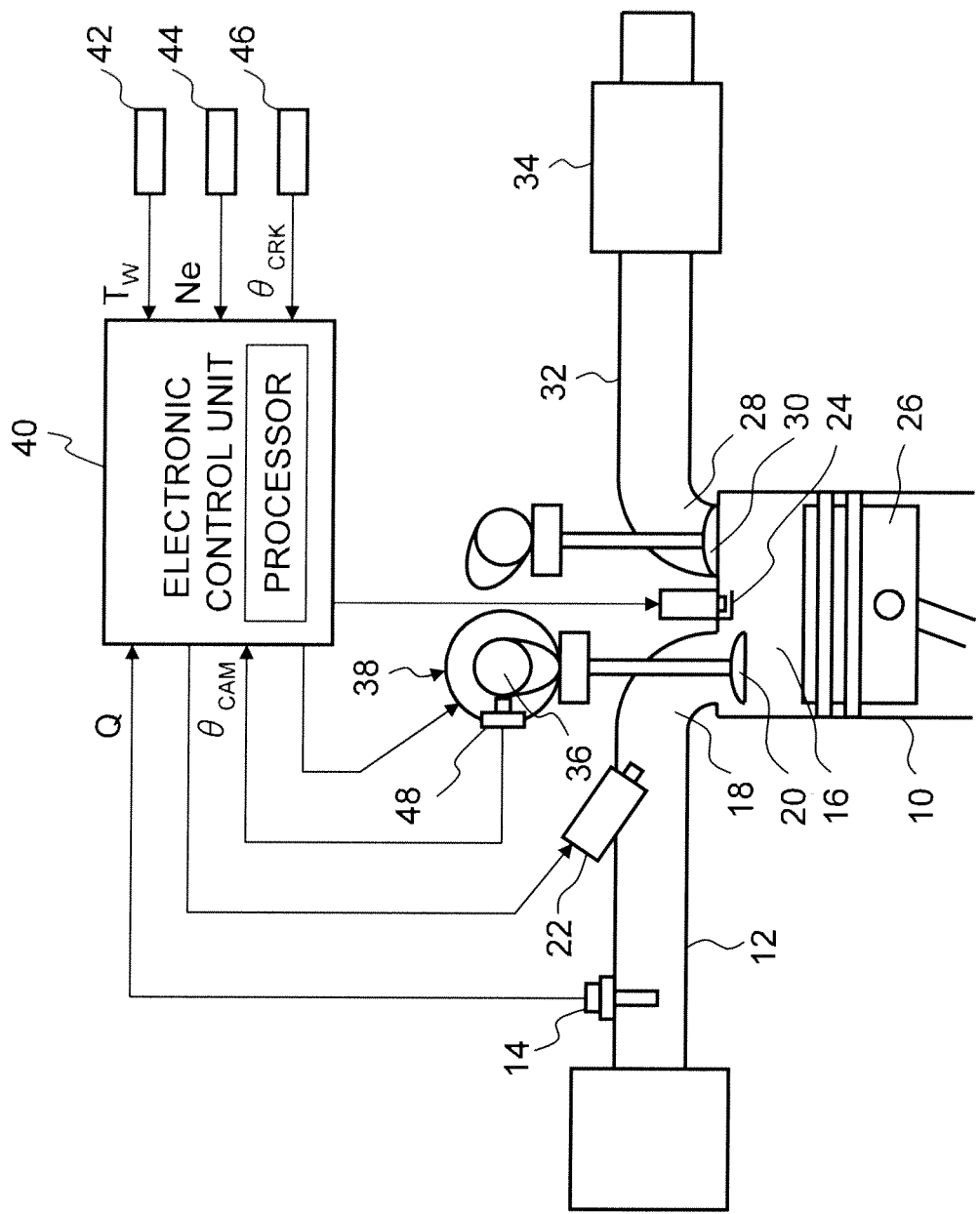
FIG. 1 is a schematic configuration view of a vehicle engine system.

FIG. 1 illustrates the structure of a vehicle engine system to which a VTC control unit according to the embodiment is applied.

An engine 10 is, for example, an in-line four-cylinder gasoline engine, in which an intake air flow sensor 14 for detecting an intake air flow Q as an example of a load on engine 10 is fitted into an intake pipe 12 for introducing intake air into each cylinder. As intake air flow sensor 14, for example, a hot-wire flowmeter such as an air flowmeter can be used. Note that the load on engine 10 is not limited to intake air flow Q, and a known state quantity closely associated with torque, such as intake air negative pressure, supercharging pressure, throttle opening, or accelerator opening, can be used.

An intake valve 20 is provided in an intake port 18 for introducing intake air into a combustion chamber 16 of each cylinder to open and close the opening of intake port 18. A fuel injector 22 for injecting fuel toward intake port 18 is fitted in a portion of intake pipe 12 located in the air intake upstream of intake valve 20. Fuel injector 22 is an electromagnetic fuel injector, which injects fuel when a magnetic attractive force is generated by energization of a magnet coil to lift a valve biased by a spring in a valve closing direction so as to open the valve. Fuel with pressure regulated to predetermined pressure is supplied to fuel injector 22 so that an amount of fuel proportional to the valve opening time is injected.

Fuel injected from fuel injector 22 is introduced into combustion chamber 16 through a gap between intake port 18 and intake valve 20 together with intake air, and ignited and burned by spark ignition of a spark plug 24. The pressure exerted by the burning pushes a piston 26 down toward a crankshaft (not illustrated) to drive the crankshaft to rotate.

Furthermore, an exhaust valve 30 is provided in an exhaust port 28 for discharging exhaust gas from combustion chamber 16 to open and close the opening of exhaust port 28. When exhaust valve 30 is opened, exhaust gas is exhausted into an exhaust pipe 32 through a gap between exhaust port 28 and exhaust valve 30. A catalytic converter 34 is arranged in exhaust pipe 32. Harmful substances in the exhaust gas are converted into harmless components by catalytic converter 34 and are exhausted from a terminal opening of exhaust pipe 32 into the atmosphere. For example, as catalytic converter 34, three-way catalysts for converting CO (carbon monoxide), HC (hydrocarbon), and NOx (nitrogen oxide) in the exhaust gas at the same time can be used.

Figure 2:
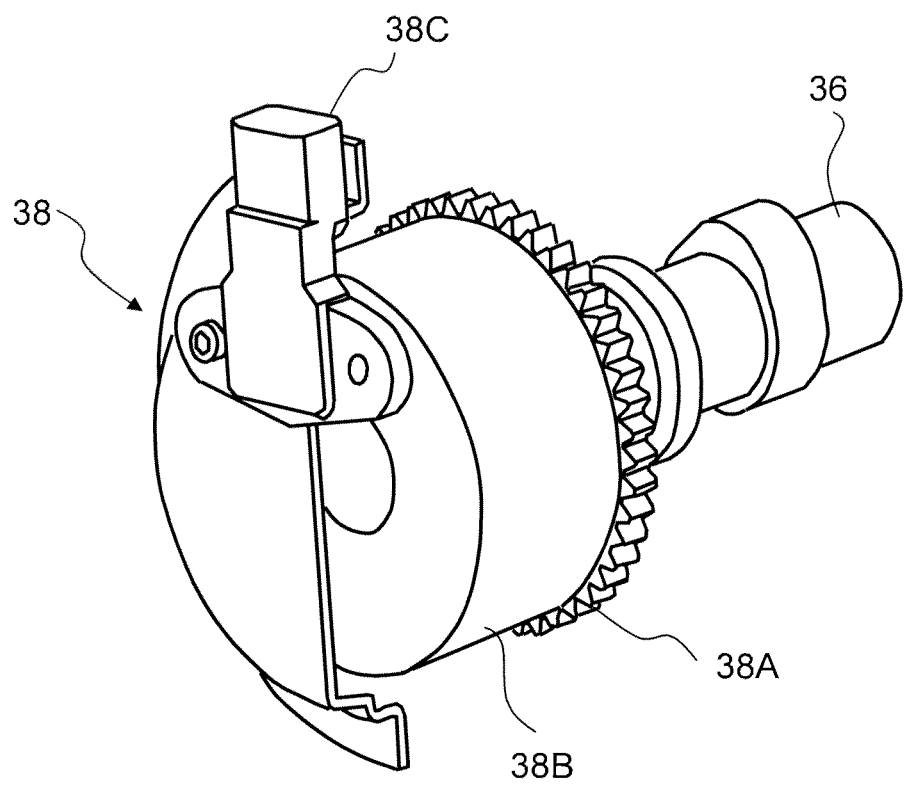
FIG. 2 is a perspective view of the details of VTC.

A VTC 38 is attached to the end of intake camshaft 36 for driving intake valve 20 to open and close, and VTC 38 changes the valve timing of intake valve 20 by changing the rotation phase of an intake camshaft 36 with respect to the crankshaft. As illustrated in FIG. 2, VTC 38 is integrated with a cam sprocket 38A, around which a cam chain for transmitting a rotational driving force of the crankshaft is wound, in which an electric motor 38B (electric actuator) with a built-in reducer rotates intake camshaft 36 relative to cam sprocket 38A to advance or retard the valve timing. Here, indicated by reference numeral 38C in FIG. 2 is a connector for connecting a harness to supply power to electric motor 38B.

Note that VTC 38 is not limited to the structure illustrated in FIG. 2, and any other structure can be adopted as long as the valve timing can be changed by an electric actuator such as an electric motor. Furthermore, VTC 38 is not limited to being provided for intake valve 20, and it may be provided for at least either intake valve 20 or exhaust valve 30.

Fuel injector 22, spark plug 24, and VTC 38 are controlled by an electronic control unit 40 with a built-in microcomputer (processor). Electronic control unit 40 inputs signals from various sensors to determine each operation amount of fuel injector 22, spark plug 24, and VTC 38 according to a pre-stored control program to be output. In fuel injection control using fuel injector 22, for example, fuel is injected individually in time with an intake stroke of each cylinder. This is so-called "sequential injection control." Note that VTC 38 may also be controlled by another electronic control unit that differs from electronic control unit 40.

Input to electronic control unit 40 in addition to a signal from intake air flow sensor 14 are signals respectively from a water temperature sensor 42 for detecting a coolant temperature (water temperature) Tw of engine 10, an engine speed sensor 44 for detecting an engine speed Ne of engine 10, a crank angle sensor 46 for detecting a crankshaft rotation angle (angle from a reference position) $\theta_{CRK}$, and a cam angle sensor 48 for detecting a rotation angle $\theta_{CAM}$ of intake camshaft 36.

In addition to the control of VTC 38 to be described later, electronic control unit 40 controls fuel injector 22 and spark plug 24 as follows, that is, electronic control unit 40 reads intake air flow Q and engine speed Ne from intake air flow sensor 14 and engine speed sensor 44, respectively, to calculate a basic amount of fuel injection according to the engine operating conditions based on intake air flow Q and engine speed Ne. Furthermore, electronic control unit 40 reads water temperature Tw from water temperature sensor 42 to calculate an amount of fuel injection obtained by correcting the basic amount of fuel injection by water temperature Tw and the like. Then, electronic control unit 40 injects fuel corresponding to the amount of fuel injection from fuel injector 22 at a timing according to the engine operating conditions to actuate spark plug 24 accordingly to ignite and burn a mixture of fuel and intake air. At this time, electronic control unit 40 reads an air-fuel ratio from an air-fuel ratio sensor (not shown) to perform feedback control on fuel injector 22 so that the air-fuel ratio in the exhaust gas will approximate a theoretical air-fuel ratio.

Figure 3:
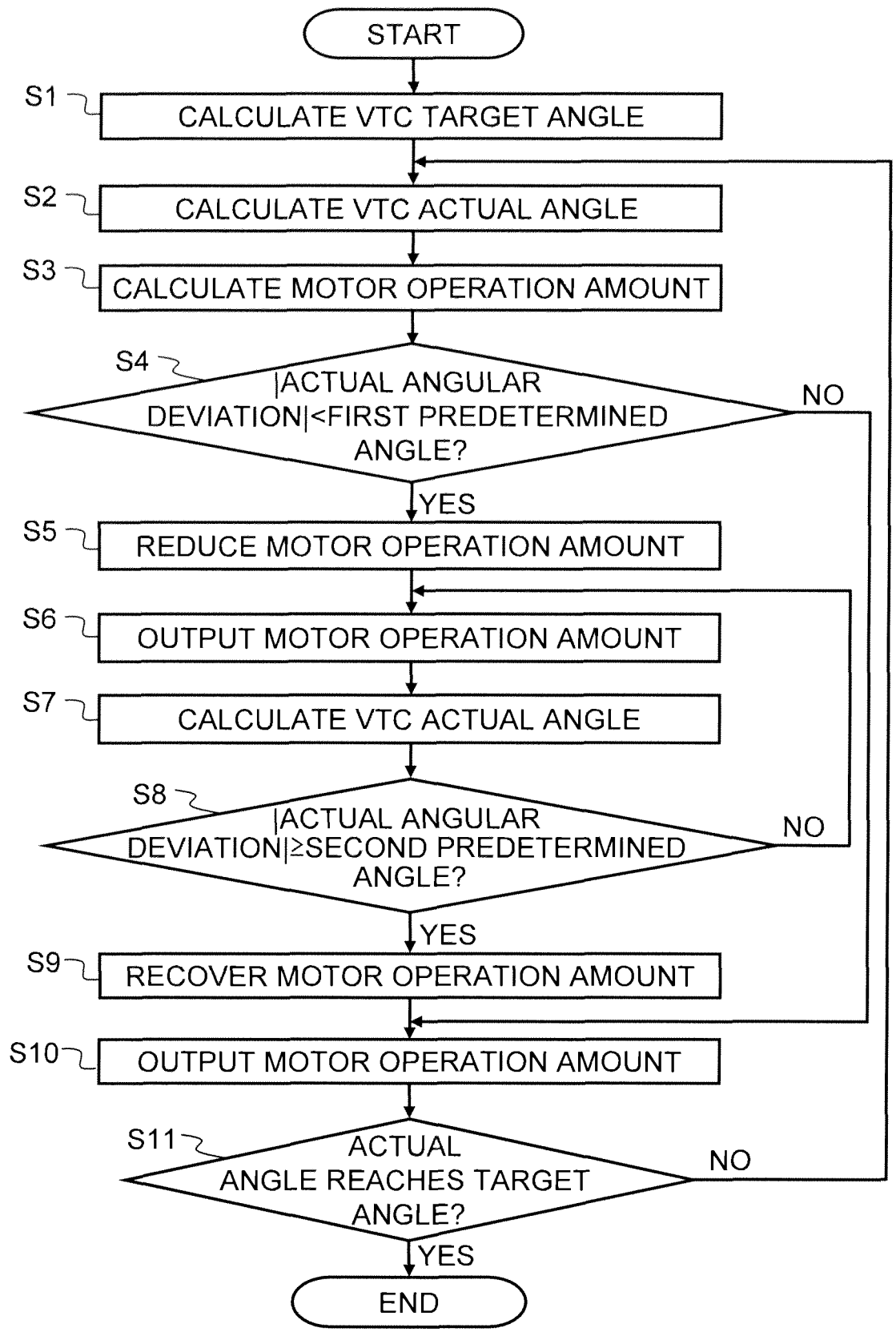
FIG. 3 is a flowchart of a first example of a control program.

FIG. 3 illustrates a first example of a control program to be executed repeatedly by electronic control unit 40 after the start of engine 10.

In step 1 (abbreviated as "S1" in FIG. 3; the same will be applied hereinafter), electronic control unit 40 calculates a target angle of VTC 38 according to the engine operating conditions. In other words, electronic control unit 40 reads intake air flow rate Q, water temperature Tw, and engine speed Ne from intake air flow sensor 14, water temperature sensor 42, and engine speed sensor 44, respectively. Then, electronic control unit 40 refers to, for example, a table in which a target angle according to the engine speed and the intake air flow is set per water temperature to determine a target angle according to water temperature Tw, engine speed Ne, and intake air flow Q.

In step 2, electronic control unit 40 calculates an actual angle of VTC 38 (actual angle from a reference position). In other words, electronic control unit 40 reads rotation angle $\theta_{CRK}$ of the crankshaft and rotation angle $\theta_{CAM}$ of intake camshaft 36 from crank angle sensor 46 and cam angle sensor 48, respectively. Then, electronic control unit 40 determines the actual angle of VTC 38 with an advance side chosen as positive values by, for example, subtracting rotation angle $\theta_{CRK}$ of the crankshaft from rotation angle $\theta_{CAM}$ of intake camshaft 36.

Here, any one of the following sensor systems may be used as crank angle sensor 46 and cam angle sensor 48.

A first sensor system uses a sensor for detecting a rotation angle for each discrete predetermined angle (hereinafter called "sensor A"). In this case, a sensor signal used for another control is diverted for cost reduction, but this system suffers from the disadvantage of reducing the angle detection frequency per unit time, in particular, a low rpm range of the engine.

A second sensor system uses a sensor for detecting a rotation angle for each unit angle, i.e., a sensor for continuously outputting rotation angles (hereinafter called "sensor B"). In this case, the system has the disadvantage of increasing the unit price of the sensor, but has the advantage of increasing the angle detection frequency per unit time even in the low rpm range of the engine.

Figure 4:
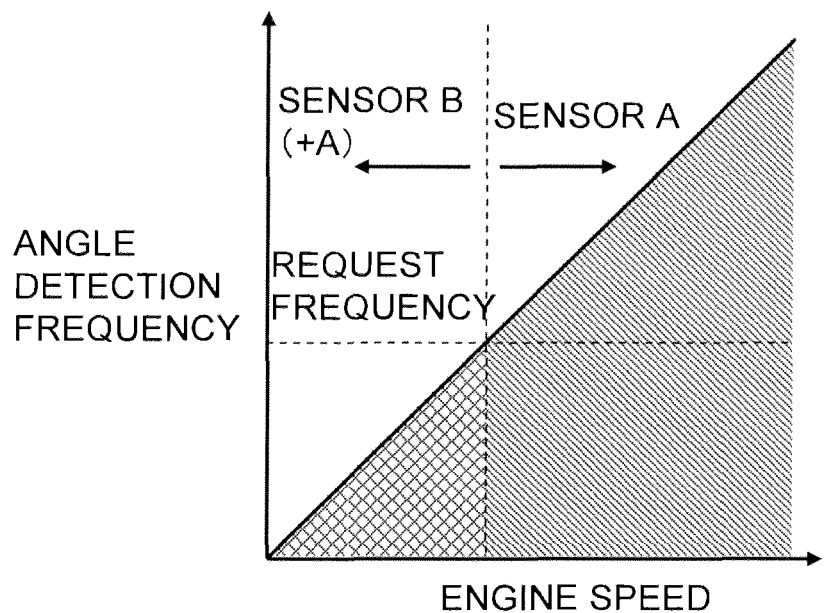
FIG. 4 is an explanatory view of sensors for detecting the rotation angles of a crankshaft and a camshaft.

As shown in FIG. 4, a third sensor system uses both sensor A and sensor B in such a manner that sensor A is used in one rpm range of the engine in which the angle detection frequency required by VTC 38 is satisfied and sensor B is used in the other rpm range of the engine in which the angle detection frequency is not satisfied. In short, in a low rpm range in which the engine speed is equal to or less than a predetermined speed, the rotation angle is detected by sensor B, and in a high rpm range in which the engine speed is higher than the predetermined speed, the rotation angle is detected by sensor A. In this case, a sufficient angle detection frequency can be obtained in the whole rpm range of engine 10.

A fourth sensor system uses both sensor A and sensor B as shown in FIG. 4 in such a manner that sensor A is used in one rpm range of the engine in which the angle detection frequency required by VTC 38 is satisfied and, in the other rpm range of the engine in which the angle detection frequency is not satisfied, sensor B is used while correcting sensor B by sensor A. In short, in the low rpm range in which the engine speed is equal to or less than a predetermined speed, the rotation angle detected by sensor B is corrected by the rotation angle detected by sensor A, and in the high rpm range in which the engine speed is greater than the predetermined speed, the rotation angle is detected by sensor A. In this case, a sufficient angle detection frequency and angle detection accuracy can be obtained in the whole rpm range of engine 10.

In step 3, electronic control unit 40 calculates an operation amount (e.g., duty or the like) of electric motor 38B based on deviation between the target angle and the actual angle of VTC 38.

In step 4, electronic control unit 40 determines whether the absolute value of deviation (actual angular deviation) between the actual angle of VTC 38 calculated the last time and the actual angle of VTC 38 calculated this time is less than a first predetermined angle to determine whether electric motor 38B is in a locked state. In other words, when there is little change in actual angular deviation of VTC 38, electronic control unit 40 determines that such a "locked state" that a torque necessary to change the valve timing is greater than the maximum torque of electric motor 38B has occurred. Then, when electronic control unit 40 determines that the absolute value of actual angular deviation is less than a first predetermined angle (occurrence of the locked state), the process proceeds to step 5 (Yes), whereas when it determines that the absolute value of actual angular deviation is equal to or greater than the first predetermined angle, the process proceeds to step 10 (No).

Here, for example, in order to prevent an erroneous operation due to superimposed noise, when such a state that the absolute value of actual angular deviation is less than the first predetermined angle continues a predetermine number of times, it may be determined that electric motor 38B is in the locked state. The determination that the locked state has occurred can be made more quickly as the first predetermined angle is greater or as the predetermined number of times is smaller.

Figure 5:
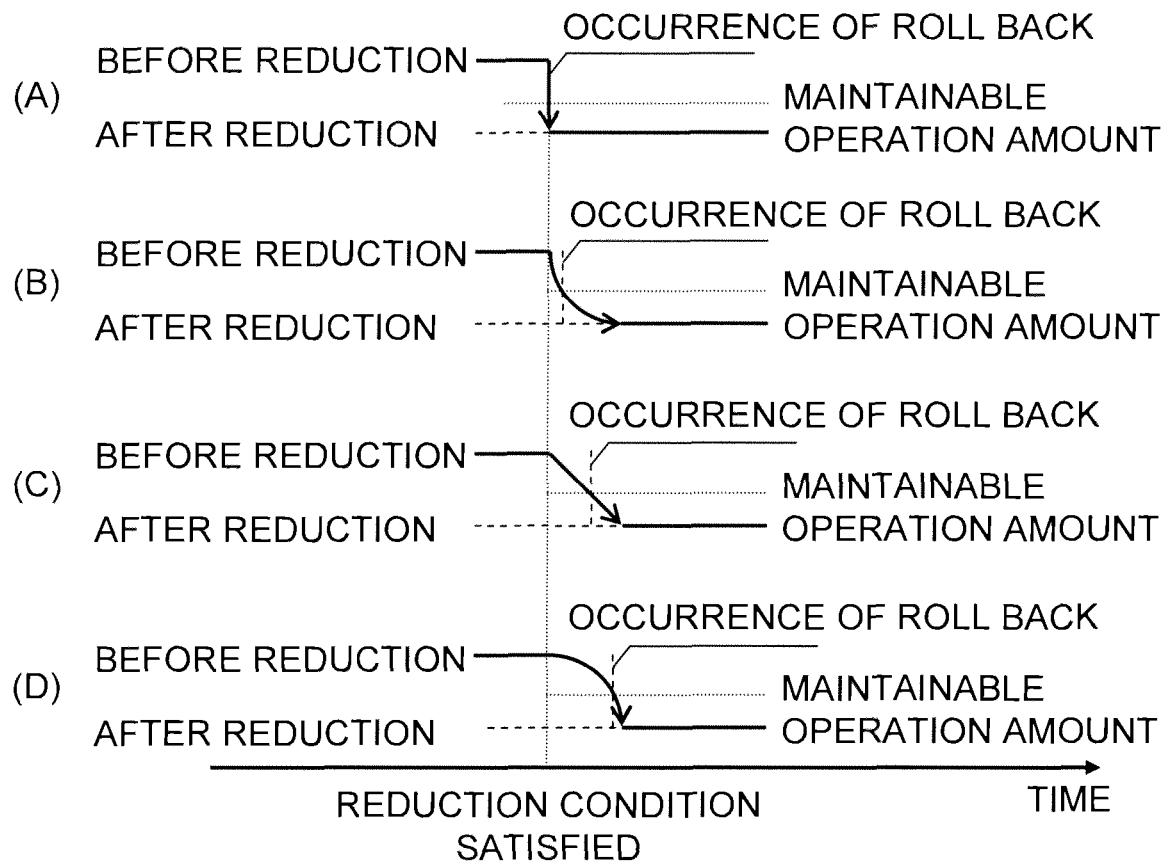
FIG. 5 is an explanatory view of methods of reducing a motor operation amount.

In step 5, electronic control unit 40 reduces the motor operation amount calculated in step 3 to an operation amount capable of maintaining the current angle of VTC 38 against the cam torque. As the method of deciding on a motor operation amount finally reduced, (1) method using a learning value or (2) method using a table, to be described later, can be adopted. Furthermore, as shown in FIG. 5, the motor operation amount may be reduced as follows: (A) straight-down reduction, (B) reduction in a concave downsweep shape, (C) gradual (stepwise) reduction, or (D) reduction in a convex downsweep shape.

When the motor operation amount is reduced at the same timing, the effects of suppressing power consumption due to the reductions in motor operation amount have the following relationship: (A) straight-down reduction>(greater than) (B) reduction in the concave downsweep shape>(greater than) (C) gradual reduction>(greater than) (D) reduction in the convex downsweep shape. Although differences among the control loads are small relative to the overall control of VTC 38, there are locally the following relationship: (A) straight-down reduction<(less than) (C) gradual reduction<(less than) (B) reduction in a concave downsweep shape (approximately equal to) (D) reduction in a convex downsweep shape. Furthermore, when the motor operation amount is reduced to be less than the motor operation amount capable of maintaining the current angle of VTC 38, VTC 38 is rolled back under the cam torque in a direction opposite to the target direction. In this case, the delays in angular variation due to the roll back of VTC 38 have the following relationship: (A) straight-down reduction>(greater than) (B) reduction in concave downsweep shape>(greater than) (C) gradual reduction>(greater than) (D) reduction in convex downsweep shape.

Therefore, the method of reducing the motor operation amount can be selected appropriately in consideration of these characteristics (relationship).

Method Using Learning Value

When the angle of VTC 38 is not changed, i.e., when the angle of VTC 38 is substantially constant, electronic control unit 40 stores the motor operation amount at the time as a learning value. Specifically, in a state in which engine speed Ne of engine 10 is equal to or less than the predetermined speed, when the absolute value of actual angular deviation which is less than a first predetermined value continuously continues a predetermine number of times (i.e., the state continues for a predetermined time), electronic control unit 40 stores, as the learning value, an average value of the motor operation amount at the time in a nonvolatile memory such as a flash ROM (Read Only Memory). In short, when engine speed Ne of engine 10 is equal to or less than the predetermined speed and the cam phase is not changed by VTC 38 for the predetermined time, electronic control unit 40 learns the average value of the operation amount of electric motor 38B. Then, electronic control unit 40 refers to the learning value stored in the nonvolatile memory to reduce the motor operation amount to the learning value. Thus, the operation amount capable of maintaining the current angle of VTC 38 can be determined in consideration of variations in actual equipment.

In this case, the learning value may be stored for each water temperature Tw of engine 10 to deal with a change in motor operation amount associated with a change in water temperature. In other words, when the motor torque is proportional to a current value as the property of electric motor 38B and applied voltage is constant, coil resistance is lower as the temperature is reduced. Therefore, when water temperature Tw correlated with the temperature of electric motor 38B drops, since the value of current flowing through electric motor 38B increases to increase the motor torque, the motor operation amount that can be reduced becomes larger. Therefore, the learning value is switched according to water temperature Tw of engine 10 to perform control in consideration of the torque of electric motor 38B varying with temperature, so that the power consumption can be more suppressed.

When the motor operation amount is reduced, if the motor operation amount is reduced to a value obtained by adding a predetermined allowance to the learning value, the variation in angle of VTC 38 due to an erroneous operation can be suppressed.

Method Using Table

A table is prepared in which the motor operation amount capable of maintaining the angle of VTC 38 is set per water temperature in the case of occurrence of the locked state. Then, electronic control unit 40 refers to the table to determine a motor operation amount according to water temperature Tw so as to reduce the motor operation amount to this value. In this case, control is performed in consideration of the torque of electric motor 38B varying with temperature, so that the power consumption can be further suppressed.

In step 6, electronic control unit 40 outputs the motor operation amount to electric motor 38B. Here, the motor operation amount is output to electric motor 38B every predetermined time according to the drive frequency of VTC 38 (the same will be applied hereinafter).

In step 7, electronic control unit 40 calculates the actual angle of VTC 38 in the same way as step 2.

In step 8, electronic control unit 40 determines whether the absolute value of actual angular deviation is equal to or greater than a second predetermined angle to determine whether the locked state of electric motor 38B is released. In other words, when the actual angular deviation of VTC 38 is changed after the motor operation amount is reduced, electronic control unit 40 determines that the torque necessary to change the valve timing is less than the maximum torque of electric motor 38B and hence the locked state is released. Then, when electronic control unit 40 determines that the absolute value of actual angular deviation is equal to or greater than the second predetermined angle (the locked state is released), the process proceeds to step 9 (Yes), whereas when it determined that the absolute value of actual angular deviation is less than the second predetermined angle (the locked state continues), the process returns to step 6 (No).

Here, the determination that the locked state has been released can be made more promptly as the second predetermined angle is smaller. The second predetermined angle may take the same value as the first predetermined angle. However, making the second predetermined angle different from the first predetermined angle can cause a hysteresis in performing control, thereby suppressing a frequent repetition of the determination on the occurrence of the locked state and the determination on the release of the locked state.

Figure 6:
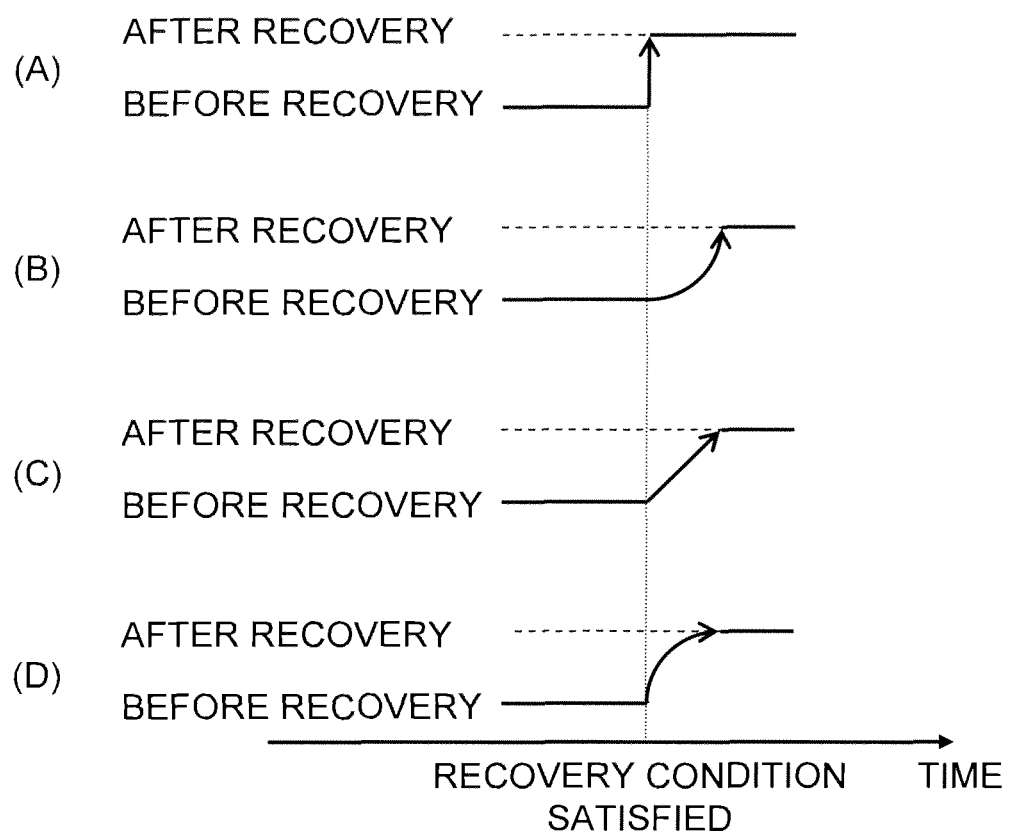
FIG. 6 is an explanatory view of methods of recovering the motor operation amount.

In step 9, electronic control unit 40 recovers the motor operation amount reduced in step 5, i.e., it returns the motor operation amount to that before being reduced. Note that the motor operation amount may be recovered to a value according to the deviation between the target angle and the actual angle of VTC 38. Furthermore, as shown in FIG. 6, the motor operation amount may be recovered as follows: (A) straight-up recovery, (B) recovery in a concave upsweep shape, (C) gradual (stepwise) recovery, or (D) recovery in a convex upsweep shape.

When the motor operation amount is recovered at the same timing, the effects of suppressing power consumption by recovering the motor operation amount have the following relationship: (B) recovery in the concave upsweep shape>(greater than) (C) gradual recovery>(greater than) (D) recovery in the convex upsweep shape>(greater than) (A) straight-up recovery. Although differences among the control loads are small relative to the overall control of VTC 38, there are locally the following relationship: (A) straight-up recovery<(less than) (C) gradual recovery<(less than) (B) recovery in the concave upsweep shape (approximately equal to) (D) recovery in the convex upsweep shape.

Therefore, the method of recovering the motor operation amount can be selected appropriately in consideration of these characteristics (relationship).

In step 10, electronic control unit 40 outputs the motor operation amount to electric motor 38B.

In step 11, electronic control unit 40 determines whether the actual angle of VTC 38 reaches the target angle. Then, when electronic control unit 40 determines that the actual angle reaches the target angle, the process is ended (Yes), whereas when it determines that the actual angle does not reach the target angle, the process returns to step 2 (No).

According to this electronic control unit 40, when the angle of VTC 38 is changed to the target angle, when the actual angular deviation of VTC 38 is less than the first predetermined angle, it is determined that the "locked state" in which the torque necessary to change the valve timing is greater than the maximum torque of electric motor 38B has occurred. Then, when the locked state occurs, the motor operation amount according to the deviation between the target angle and the actual angle of VTC 38 is reduced to a level capable of maintaining the angle of VTC 38 against the cam torque. In short, electronic control unit 40 determines the influence on the operation of VTC 38 based on the engine operating conditions to reduce the operation amount of electric motor 38B in a predetermined range of the rotation angle of intake camshaft 36 based on the determination result.

After that, when the actual angular deviation of VTC 38 is equal to or greater than the second predetermined angle, the torque necessary to change the valve timing is smaller than the maximum torque of electric motor 38B, thereby determining that the locked state has been released. Then, when the locked state is released, the motor operation amount reduced in the locked state is recovered.

Figure 7:
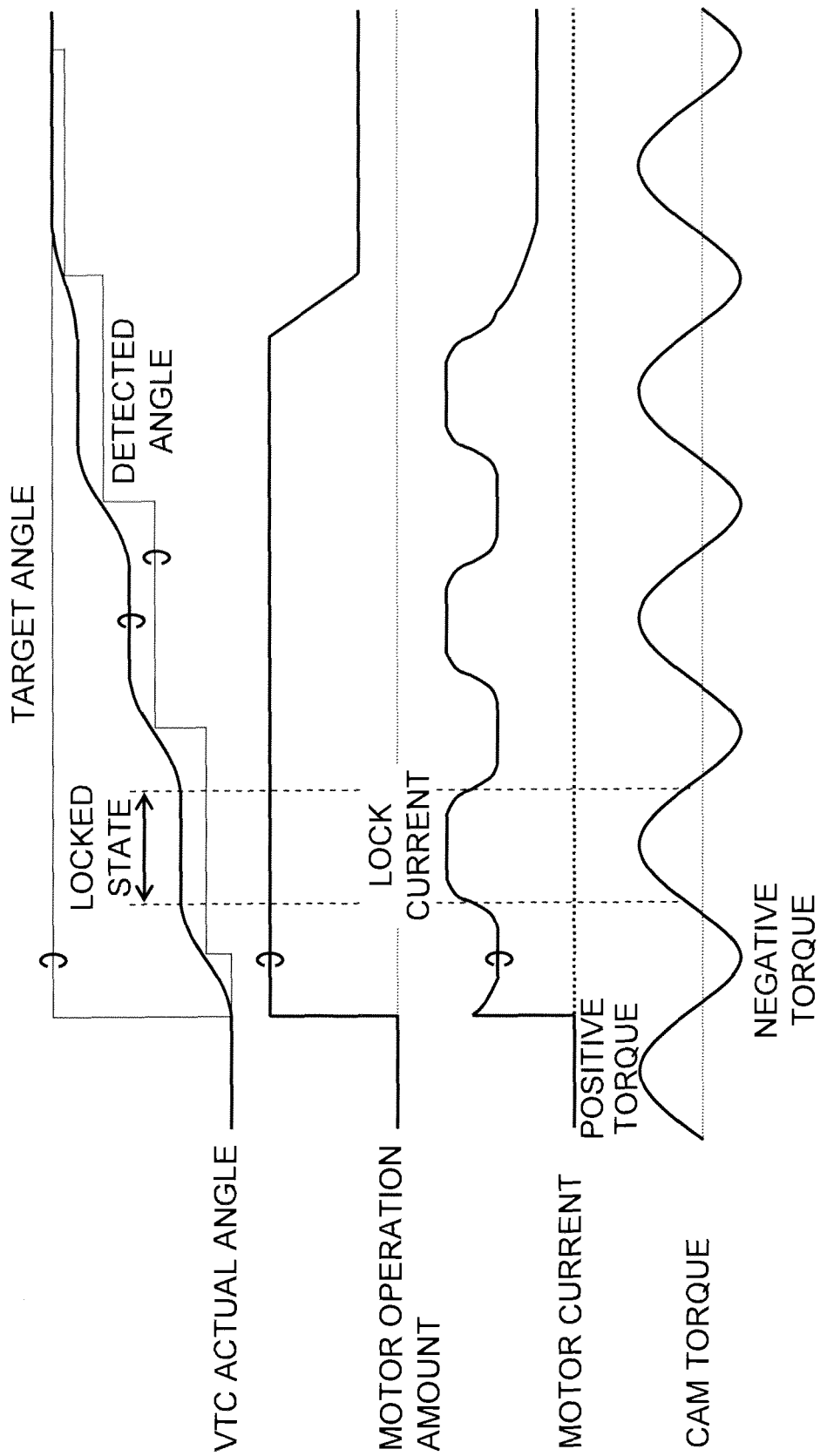
FIG. 7 is an explanatory view of various states involved in changing a VTC angle in a conventional technique.
Figure 8:
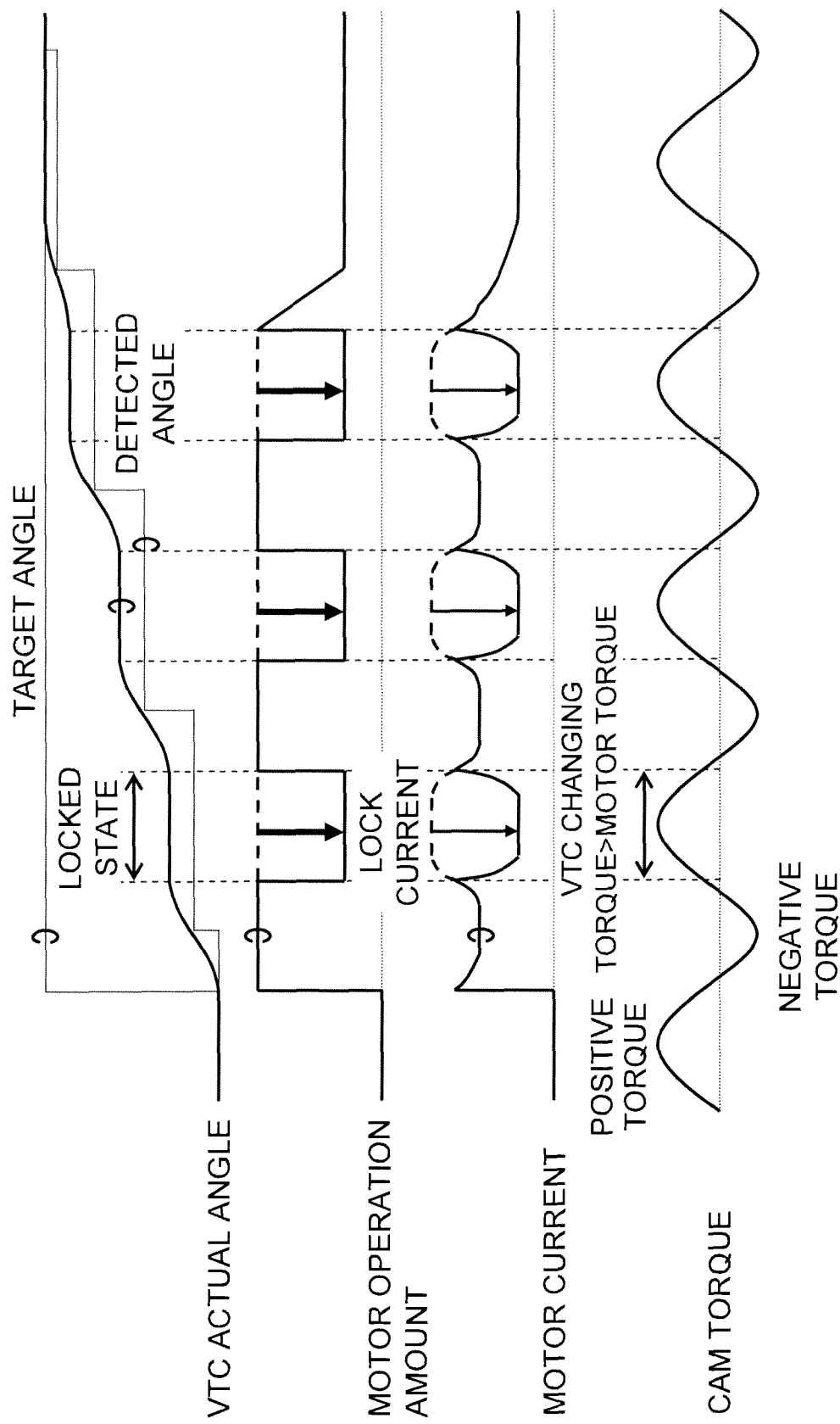
FIG. 8 is an explanatory view of various states involved in changing the VTC angle in the proposed technique.

Thus, in the conventional technique, as shown in FIG. 7, when the locked state in which the angle of VTC 38 is not changed occurs, a lock current is generated in the motor current, consuming power wastefully. On the other hand, in this proposed technique, as shown in FIG. 8, when the locked state occurs, the motor current is reduced to allow the reduction of power consumption by an amount corresponding to the reduction in motor current. Furthermore, since the lock current becomes unlikely to occur in electric motor 38B, the generation of heat in a motor drive circuit can also be reduced.

When the locked state is occurring, since the torque necessary to change the valve timing is greater than the maximum torque of electric motor 38B, it is impossible to change the angle of VTC 38. Therefore, even when the motor operation amount is reduced in a range in which the current angle of VTC 38 can be maintained, it does not affect the operation of VTC 38.

Figure 9:
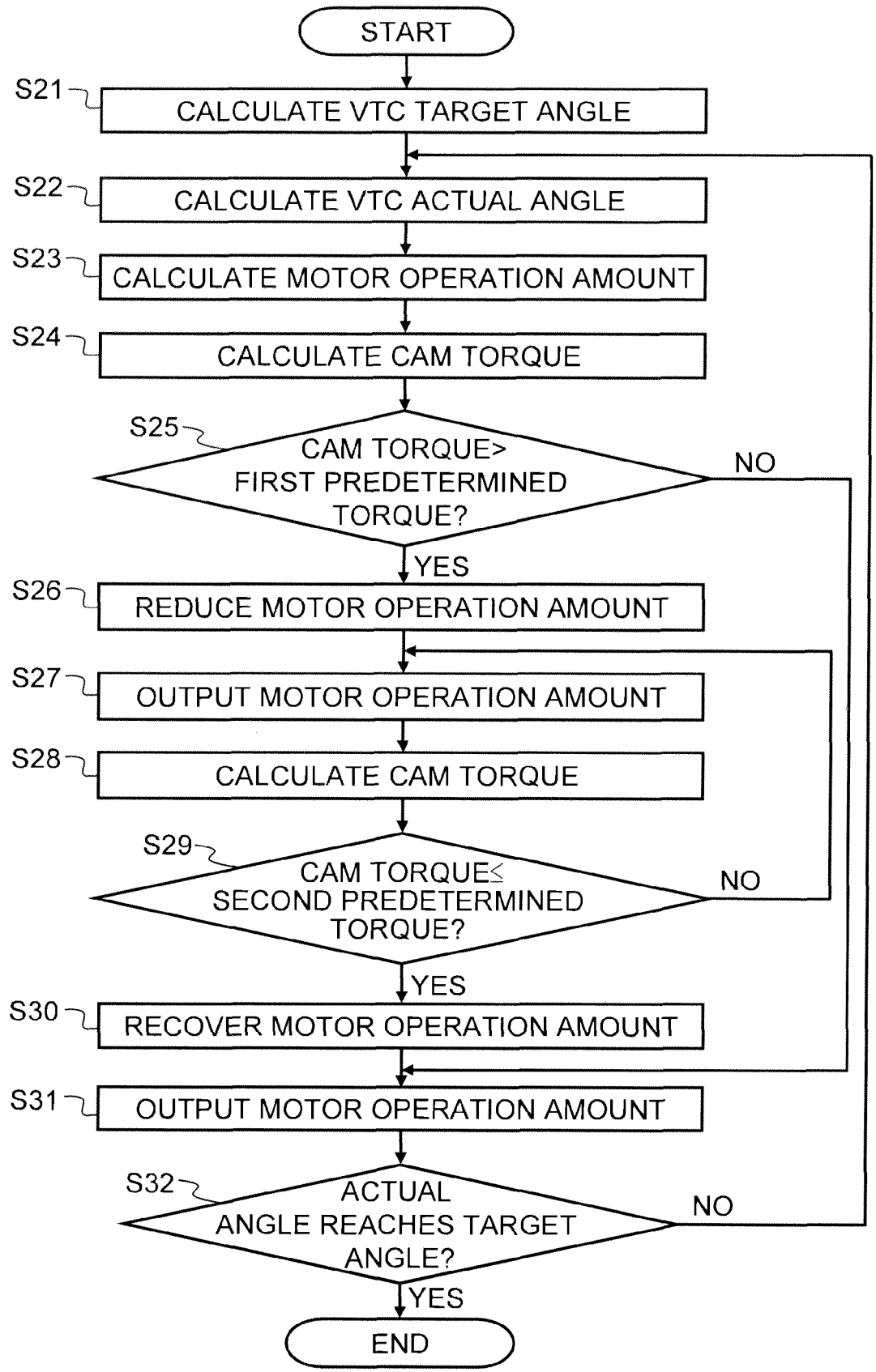
FIG. 9 is a flowchart of a second example of the control program.

FIG. 9 illustrates a second example of the control program to be executed repeatedly by electronic control unit 40 after the start of engine 10. Note that the description of the control contents that is the same as in the aforementioned first example will be simplified to omit redundant description (the same will be applied hereinafter).

In step 21, electronic control unit 40 calculates a target angle of VTC 38 according to the engine operating conditions.

In step 22, electronic control unit 40 calculates an actual angle of VTC 38.

In step 23, electronic control unit 40 calculates an operation amount of electric motor 38B based on deviation between the target angle and the actual angle of VTC 38.

In step 24, electronic control unit 40 calculates a cam torque acting on VTC 38. In other words, for example, electronic control unit 40 refers to a table in which a cam torque according to the rotation angle of the crankshaft and the angle of VTC 38 is set to represent the rotational state of the camshaft to determine a cam torque according to the rotation angle $\theta_{CRK}$ of the crankshaft and the actual angle of VTC 38. Then, in electronic control unit 40, the cam torque is multiplied by a reduction ratio of electric motor 38B to determine the cam torque acting on VTC 38. The cam torque may also be determined, for example, from distortion of the camshaft or the like.

In step 25, electronic control unit 40 determines whether the cam torque acting on VTC 38 is greater than a first predetermined torque to determine whether electric motor 38B is in a locked state. The first predetermined torque can take, for example, the maximum torque of electric motor 38B or a value slightly smaller than the value of the maximum torque. Then, when electronic control unit 40 determines that cam torque acting on VTC 38 is greater than the first predetermined torque (occurrence of the locked state), the process proceeds to step 26 (Yes), whereas when it determines that the cam torque acting on VTC 38 is equal to or less than the first predetermined torque, the process proceeds to step 31 (No).

Here, for example, in order to prevent an erroneous operation due to superimposed noise, when a state such as one in which the cam torque acting on VTC 38 is greater than the first predetermined torque continues a predetermine number of times, it may be determined that electric motor 38B is in the locked state. The determination that the locked state has occurred can be made more promptly as the first predetermined torque is smaller. Furthermore, when the first predetermined torque is smaller than the maximum torque of electric motor 38B, the occurrence of the locked state can be determined before the rotation of electric motor 38B is actually stopped. In addition, in order to enhance the determination accuracy of the locked state, the first predetermined torque can also be changed according to the operation amount of electric actuator 38B in consideration of the output characteristics of electric motor 38B.

In step 26, electronic control unit 40 reduces the motor operation amount calculated in step 23 to an operation amount capable of maintaining the current angle of VTC 38 against the cam torque.

In step 27, electronic control unit 40 outputs the motor operation amount to electric motor 38B.

In step 28, electronic control unit 40 calculates the cam torque acting on VTC 38 in the same way as step 24.

In step 29, electronic control unit 40 determines whether the cam torque acting on VTC 38 is equal to or less than a second predetermined torque to determine whether the locked state of electric motor 38B is released. Then, when electronic control unit 40 determines that the cam torque acting on VTC 38 is equal to or less than the second predetermined torque (the locked state is released), the process proceeds to step 30 (Yes), whereas when it determines that the cam torque acting on VTC 38 is greater than the second predetermined torque (the locked state continues), the process returns to step 27 (No).

Here, the determination that the locked state has been released can be made more promptly as the second predetermined torque is greater. The second predetermined torque may take the same value of the first predetermined torque. However, making the second predetermined torque different from the first predetermined torque can cause a hysteresis in performing control, thereby suppressing a frequent repetition of the determination on the occurrence of the locked state and the determination on the release of the locked state.

In step 30, electronic control unit 40 recovers the motor operation amount reduced in step 26, i.e., it returns the motor operation amount to that before being reduced.

In step 31, electronic control unit 40 outputs the motor operation amount to electric motor 38B.

In step 32, electronic control unit 40 determines whether the actual angle of VTC 38 reaches the target angle. Then, when electronic control unit 40 determines that the actual angle reaches the target angle, the process is ended (Yes), whereas when it determines that the actual angle does not reach the target angle, the process returns to step 22 (No).

According to this electronic control unit 40, it is determined whether the locked state occurs in electric motor 38B or whether the locked state is released according to the cam torque acting on VTC 38 instead of the actual angular deviation in the aforementioned first example. At this time, the cam torque acting on VTC 38 is determined from the cam torque, determined from the angle $\theta_{CRK}$ of the crankshaft and the actual angle of VTC 38, and the reduction ratio of electric motor 38B. Thus, the cam torque acting on VTC 38 takes such a value in view of a state in which intake camshaft 36 drives intake valve 20 to open and close, so that the estimation accuracy can be enhanced. Since the other operations and effects are the same as those in the aforementioned first example, the description thereof will be omitted.

Furthermore, in the second example, the cam torque acting on VTC 38 is compared with the first predetermined torque or the second predetermined torque to determine the occurrence and release of the locked state, but the determinations may also be made as follows: A torque output by electric motor 38B is estimated to compare this torque with the cam torque acting on VTC 38 in order to determine the occurrence and release of the locked state. In other words, a torque [Nm] output by electric motor 38B has the characteristics of being proportional to the motor operation amount (voltage) and inversely proportional to the resistance of the motor coil. Therefore, if the torque constant as a conversion coefficient is denoted as k, torque [Nm] can be determined from motor operation amount [V]/resistance [Ω]×torque constant k. This will compare the actual motor torque and cam torque to determine the occurrence and release of the locked state, so that the determination accuracy can be enhanced.

Figure 10:
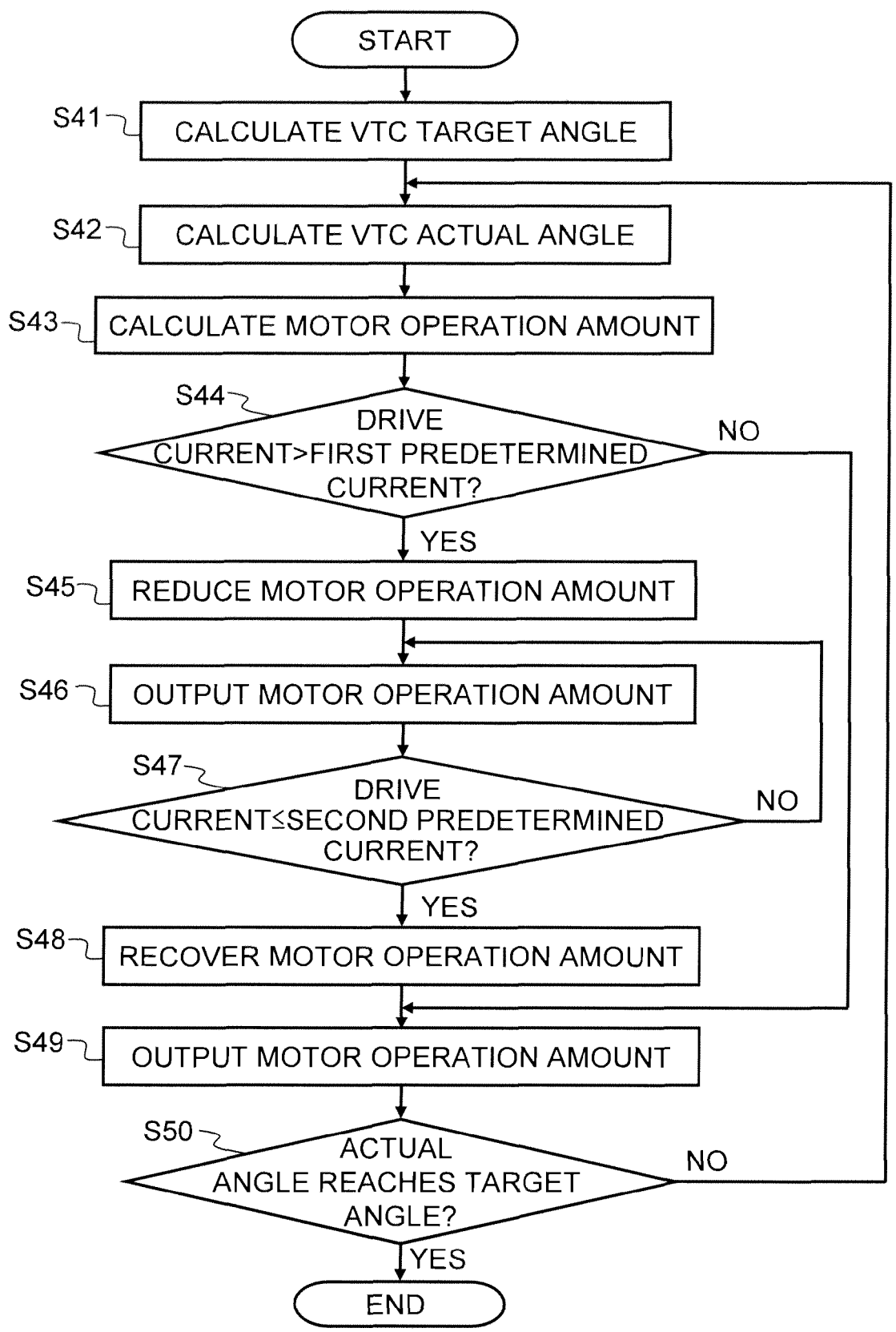
FIG. 10 is a flowchart of a third example of the control program.

FIG. 10 illustrates a third example of the control program to be executed repeatedly by electronic control unit 40 after the start of engine 10.

In step 41, electronic control unit 40 calculates a target angle of VTC 38 according to the engine operating conditions.

In step 42, electronic control unit 40 calculates an actual angle of VTC 38.

In step 43, electronic control unit 40 calculates an operation amount of electric motor 38B based on deviation between the target angle and the actual angle of VTC 38.

In step 44, electronic control unit 40 determines whether the drive current of electric motor 38B is greater than a first predetermined current to determine whether electric motor 38B is in a locked state. As the drive current of electric motor 38B, for example, a value detected in a current detection circuit, a value estimated from the speed of rotation of electric motor 38B, or the like can be adopted. For example, the first predetermined current can take a lock current or a value slightly smaller than the lock current. Then, when electronic control unit 40 determines that the drive current of electric motor 38B is greater than the first predetermined current (occurrence of the locked state), the process proceeds to step 45 (Yes), whereas when it determines that the drive current of electric motor 38B is equal to or less than the first predetermined current, the process proceeds to step 49 (No).

Here, for example, in order to prevent an erroneous operation due to superimposed noise, when such a state that the drive current of electric motor 38B is greater than the first predetermined current continues for a predetermined time, it may be determined that electric motor 38B is in the locked state. The determination that the locked state has occurred can be made more promptly as the first predetermined current is smaller or the predetermined time is shorter.

In step 45, electronic control unit 40 reduces the motor operation amount calculated in step 43 to an operation amount capable of maintaining the current angle of VTC 38 against the cam torque.

In step 46, electronic control unit 40 outputs the motor operation amount to electric motor 38B.

In step 47, electronic control unit 40 determines whether the drive current of electric motor 38B is equal to or less than a second predetermined current to determine whether the locked state of electric motor 38B is released. Then, when electronic control unit 40 determines that the drive current of electric motor 38B is equal to or less than the second predetermined current (the locked state is released), the process proceeds to step 48 (Yes), whereas when it determines that the drive current of electric motor 38B is greater than the second predetermined current (the locked state continues), the process returns to step 46 (No).

Here, the determination that the locked state has been released can be made more promptly as the second predetermined current is greater. The second predetermined current may take the same value as the first predetermined current. However, making the second predetermined current different from the first predetermined current can cause a hysteresis in performing control, thereby suppressing a frequent repetition of the determination on the occurrence of the locked state and the determination on the release of the locked state.

In step 48, electronic control unit 40 recovers the motor operation amount reduced in step 45, i.e., it returns the motor operation amount to that before being reduced.

In step 49, electronic control unit 40 outputs the motor operation amount to electric motor 38B.

In step 50, electronic control unit 40 determines whether the actual angle of VTC 38 reaches the target angle. Then, when electronic control unit 40 determines that the actual angle reaches the target angle, the process is ended (Yes), whereas when it determines that the actual angle does not reach the target angle, the process returns to step 42 (No).

According to this electronic control unit 40, it is determined whether the locked state occurs in electric motor 38B or whether the locked state is released according to the drive current of electric motor 38B instead of the actual angular deviation in the aforementioned first example. Therefore, it is not necessary to calculate the actual angle and hence the control load can be reduced. Since the other operations and effects are the same as those in the aforementioned first example, the description thereof will be omitted.

Some of the determination conditions described in the first to third examples may be combined to determine whether the locked state occurs in electric motor 38B or whether the locked state is released. In this case, for example, even when one condition is satisfied due to superimposed noise or the like, if any other condition is not satisfied, the occurrence or release of the locked state will not be determined, and this can prevent an erroneous operation.

In the embodiment, the processing contents described in the first to third examples may be replaced or combined freely, rather than use of each of the first to third examples separately.

The entire contents of Japanese Patent Application No. 2012-063832, filed Mar. 21, 2012, are incorporated herein by reference.

While only a select embodiment has been chosen to illustrate the present invention, it will be apparent to those skilled in the art from this disclosure that various change and modification can be made herein without departing from the scope of the invention as defined in the appended claims.

Furthermore, the foregoing descriptions of the embodiments according to the present invention are provided for illustration only, and not for the purpose of limiting the invention, the invention as claimed in the appended claims and their equivalents.

What is claimed is:

1. A control unit for a variable valve timing mechanism which changes a cam phase by an electric motor, comprising:
   a processor configured to:
      determine whether a locked state in which rotation of the electric motor is stopped has occurred based on engine operating conditions, and
      reduce an operation amount of the electric motor in a predetermined range of a rotation angle of a camshaft in the case of the locked state.

2. The control unit for a variable valve timing mechanism according to claim 1, wherein when an operation amount of the variable valve timing mechanism is less than a predetermined value, the processor is configured to determine that there is an influence on the operation of the variable valve timing mechanism.

3. The control unit for a variable valve timing mechanism according to claim 1, wherein when a cam torque acting from the camshaft onto the variable valve timing mechanism is greater than a predetermined value, the processor is configured to determine that there is an influence on the operation of the variable valve timing mechanism.

4. The control unit for a variable valve timing mechanism according to claim 1, wherein when a drive current of the electric motor is greater than a predetermined value, the processor is configured to determine that there is an influence on the operation of the variable valve timing mechanism.

5. The control unit for a variable valve timing mechanism according to claim 1, wherein when an engine speed is equal to or less than a predetermined value and the cam phase is not changed by the variable valve timing mechanism for a predetermined time, the processor is configured to learn an average value of the operation amount of the electric motor to reduce the operation amount to the average value.

6. The control unit for a variable valve timing mechanism according to claim 5, wherein the average value is learned based on water temperature of an engine.

7. The control unit for a variable valve timing mechanism according to claim 1, wherein the processor is configured to reduce the operation amount of the electric motor to a value corresponding to a water temperature of an engine.

8. The control unit for a variable valve timing mechanism according to claim 1, wherein a sensor is configured to detect the rotation angle of the camshaft so as to output the rotation angle continuously.

9. The control unit for a variable valve timing mechanism according to claim 1,
   wherein the control unit is configured to communicate with a first sensor configured to detect the rotation angle of the camshaft for each discrete predetermined angle, and a second sensor configured to detect the rotation angle of the camshaft continuously,
   wherein the second sensor is configured to detect the rotation angle of the camshaft in a low rpm range in which engine speed is equal to or less than a predetermined value, and
   wherein the first sensor is configured to detect the rotation angle of the camshaft in a high rpm range in which the engine speed is greater than the predetermined value.

10. The control unit for a variable valve timing mechanism according to claim 1, wherein the control unit is configured to communicate with a first sensor configured to detect the rotation angle of the camshaft for each discrete predetermined angle, and a second sensor configured to detect the rotation angle of the camshaft continuously,
   wherein a rotation angle detected by the second sensor is corrected by a rotation angle detected by the first sensor in a low rpm range in which engine speed is equal to or less than a predetermined value, and the rotation angle of the camshaft is detected by the first sensor in a high rpm range in which the engine speed is greater than the predetermined value.

11. A control method for a variable valve timing mechanism, the method comprising:
   controlling, via an electronic control unit, the variable valve timing mechanism so as to change a cam phase using an electric motor,
   determining whether a locked state in which rotation of the electric motor is stopped has occurred based on engine operating conditions, and
   reducing an operation amount of the electric motor in a predetermined range of a rotation angle of a camshaft in the case of the locked state.

12. The control method for a variable valve timing mechanism according to claim 11, further comprising:
   when an operation amount of the variable valve timing mechanism is less than a predetermined value, determining that there is an influence on the operation of the variable valve timing mechanism.

13. The control method for a variable valve timing mechanism according to claim 11, further comprising:
   when a cam torque acting from the camshaft onto the variable valve timing mechanism is greater than a predetermined value, determining that there is an influence on the operation of the variable valve timing mechanism.

14. The control method for a variable valve timing mechanism according to claim 11, further comprising:
   when a drive current of the electric motor is greater than a predetermined value, determining that there is an influence on the operation of the variable valve timing mechanism.

15. The control method for a variable valve timing mechanism according to claim 11, further comprising:
when an engine speed is equal to or less than a predetermined value and the cam phase is not changed by the variable valve timing mechanism for a predetermined time, learning an average value of the operation amount of the electric motor, and
reducing the operation amount to the average value.

16. The control method for a variable valve timing mechanism according to claim 15, wherein the electronic control unit learns the average value based on water temperature of an engine.

17. The control method for a variable valve timing mechanism according to claim 11, wherein reducing the operation amount of the electric motor comprises reducing the operation amount to a value corresponding to a water temperature of an engine.

18. The control method for a variable valve timing mechanism according to claim 11, further comprising:
detecting the rotation angle of the camshaft by a sensor so as to output the rotation angle continuously.

19. The control method for a variable valve timing mechanism according to claim 11, further comprising:
detecting, by a first sensor, the rotation angle of the camshaft for each discrete predetermined angle,
detecting, by a second sensor, the rotation angle of the camshaft continuously, and
using the first and second sensors such that the rotation angle of the camshaft is detected by the second sensor in a low rpm range in which engine speed is equal to or less than a predetermined value, and the rotation angle of the camshaft is detected by the first sensor in a high rpm range in which the engine speed is greater than the predetermined value.

20. The control method for a variable valve timing mechanism according to claim 11, further comprising:
detecting, by a first sensor, the rotation angle of the camshaft for each discrete predetermined angle,
detecting, by a second sensor, the rotation angle of the camshaft continuously, and
using the first and second sensors such that a rotation angle detected by the second sensor is corrected by a rotation angle detected by the first sensor in a low rpm range in which engine speed is equal to or less than a predetermined value, and the rotation angle of the camshaft is detected by the first sensor in a high rpm range in which the engine speed is greater than the predetermined value.

\* \* \* \* \*